United States Patent Office 3,714,394
Patented Jan. 30, 1973

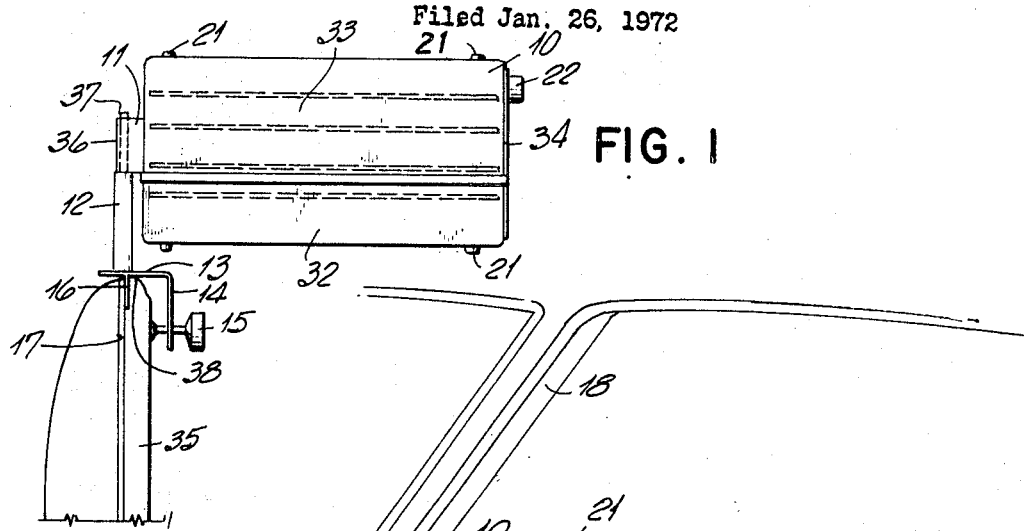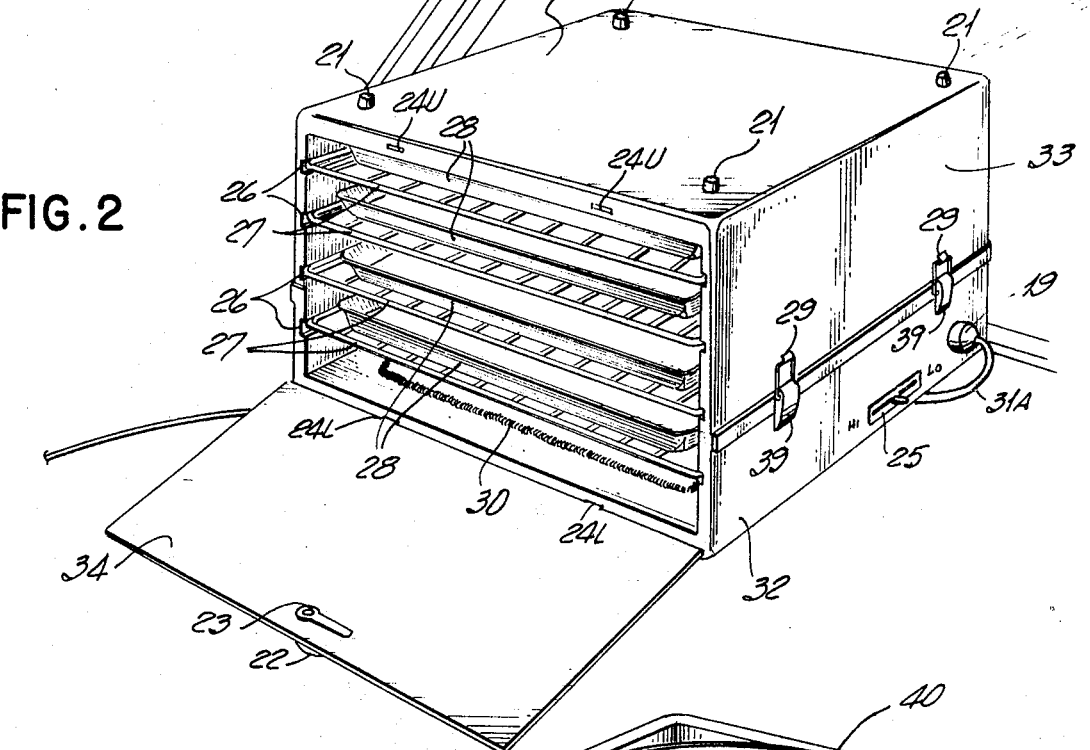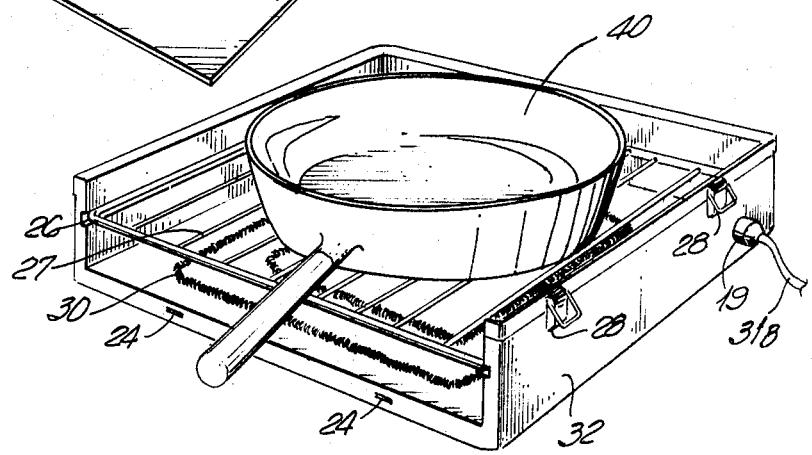

3,714,394
PORTABLE ELECTRIC OVEN
Walker Evans, Altadena, Calif., assignor to The Raymond Lee Organization, Inc., New York, N.Y.
Filed Jan. 26, 1972, Ser. No. 220,931
Int. Cl. F24c 7/10
U.S. Cl. 219—386                                    3 Claims

ABSTRACT OF THE DISCLOSURE

A portable electric oven, adaptable for mounting on an automobile door, with provisions for the insertion of trays into the oven section, the upper portion of said oven section being removable to permit the lowest heating unit to serve as an open stove grate for frying or cooking purposes using conventional pots and pans.

SUMMARY OF THE INVENTION

This invention relates to a portable electric device for the heating of foods, and particularly to a portable electric oven which may be employed in boats, campers and automobiles.

An advantage of this invention is that the invention may be used alternately as an enclosed oven, to heat food products carried on attached trays, or it may be employed as an open top stove unit to heat food in conventional pots and pans.

The invention consists of an insulated housing with provision for the mounting of several trays stacked over each other and above the heating electric element of said oven. For broiling purposes, the unit is inverted so that the heating elements are located above the highest tray mounting, and the food bearing tray is mounted in one of the sets of mounting brackets below the heating elements.

A section of the unit containing the heating elements and one set of tray mounting brackets is detachable from the assembly so as to serve as an open grate type of stove for frying purposes. In the fully assembled condition, both the top and bottom outer edges of the housing contain fittings to serve as detachable hinges for a door which may be hung from either the top or bottom fittings as desired. The door may thus be hung from the bottom most set of hinges regardless of whether the unit is mounted as a broiler, with the heating element uppermost, or as an oven with the heating unit located below the gray mounts.

The back of the assembly contains a fitting, which mates for attachment purposes to a bracket adaptable for mounting on the open window ledge of an automobile door. The bracket fits between the window and the automobile door frame, and may be clamped by an angle member to the side of the automobile door for rigidity.

The heating elements may be directly connected by an extension cord to an electrical plug which fits into the conventional cigarette lighter socket used in automobiles, or they may be directly connected by extension cord to the houshold electrical supply line. When connected to the 12 volt automobile electric supply, the device primarily serves as a food warmer; but it functions as a complete oven, broiler or open grate stove when connected to a 110 volt supply line.

BRIEF DESCRIPTION OF THE DRAWING

The objects and features of the invention may be understood with reference to the following detailed description of an illustrative embodiment of the invention, taken together with the accompanying drawing in which:

FIG. 1 is a side view of the oven mounted on the window ledge of an automobile door;

FIG. 2 is a perspective view of the device mounted as shown in FIG. 1 and loaded for use as an oven; and FIG. 3 is a perspective view of the separated heater section of the unit utilized as an open grate stove for frying purposes.

DESCRIPTION OF THE PREFERRED EMBODIMENT

Turning now descriptively to the drawing, in which similar reference characters denote similar elements throughout the several views, FIG. 1 illustrates the device 10 utilized as a food warming oven and mounted to bracket 12 which fits on the window ledge 38 of automobile door 35.

The oven 10 is integrally fastened on its rear side to fitting 11, the vertical bore 36 of which mates with vertical pin 37 of mounting bracket 12 fastened to the door frame 18.

Mounting bracket 12 terminates at its lower end in a flat plate 13 which is adaptable to resting on the open window ledge 38, with a lower projecting flat member 16 which fits between the window 17 and the door 35. An external vertical member of the bottom mounting 14 contains a threaded fastener 15 which serves as a clamp to the external side of automobile door 35.

Stove unit 10 is readily removed, by lifting in a vertical direction from bracket 12. Bracket 12 is readily removed from the frame 18 of automobile door 35, by the loosening of clamp member 15, and the lifting of bracket 12 out and off of the window ledge 38 of door 35.

As shown in FIGS. 1–3, the oven unit 10 consists of tray housing section 33, which is shown in FIG. 2 fastened to heater section 32, together with removable door 34, which may be detachably mounted to recessed hinge slots 24L at the external horizontal edges of the heater unit 32 as shown in FIG. 2, or hung from the hinge slots 24U of the tray housing section 33. Door 34 is fastened in the closed position by means of latch 23 which is rotated into the locked or unlocked position by external knob 22.

Since the oven 10 is adaptable for use as a broiler by inverting from the position shown in FIGS. 1–2, heat insulated bumpers 21 are mounted on both upper and lower external horizontal surfaces of the oven 10, for use in either mode of operation when resting the oven 10 on a flat surface.

Food bearing trays 28 fit on open grates 27 which are held by horizontal recesses 26 in the sides of the housings 32 and 33. The trays 28 may be mounted over the heating elements 30 in oven fashion, or in broiler fashion with the unit inverted so that the heating elements 30 are in the uppermost location, tray 28 may be mounted below the heating element 30 for broiling purposes.

Tray housing unit 33 may be detached from heating unit 32 by detaching clasp fasteners 39, which join clasps 29, mounted to the housing. When so separated, the heating unit 32 serves as an open grate stove as shown in FIG. 3 adaptable for frying or cooking purposes using conventional pans such as frying pan 40.

An electric switch 25 is externally mounted with means to control heating range of the heating element 30. A portable electrical cord 31A terminating in plug 19 is attached to a flush socket mounted on an external side of the housing of heating unit 32. Electric cord 31A is fitted, at its other end, with a plug for connecting to the cigarette lighter socket of an automobile. When the device is to be supplied by 110 volt current, a second extension cord 31B, fited with a standard plug for connecting to a 110 volt socket is employed. Both extension cords 31A and 31B terminate in plugs 19 which mate with the socket of the heater unit.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. A portable electrically heated oven unit, adaptable for operation as a heating oven, a broiler, or an open grate stove consisting of:

a heater section having electrical heating element and being detachably fastened to a food tray mounting section, a door which is detachable from the unit, protrusions on said door being adaptable to being fastened to slots in the external edge of the frame of the housing of the unit, so as to permit the door to open or close by rotating about the axis of a line joining said protrusions, with slots shaped so as to receive and to rotatably hold said protrusions in both the heater section and the food tray mounting section of the unit, said heater section containing provisions for mounting an open grate, so as to serve, when separated from the food tray mounting section, as an open grate stove, and a mounting fitting being fastened to one external side of the unit, said fitting being adaptable to being joined to an accessory bracket, said accessory bracket being shaped so as to rest on the window ledge of an automobile door, and with means to clamp said accessory bracket to the automobile door when it is resting on the window ledge, such that the unit when joined to the accessory bracket may be fastened to the window ledge of an automobile door, when the window is in the fully opened position.

2. The combination recited in claim 1 in which the food tray mounting section contains one or more slots in each side of said section, each said slot being parallel to the horizontal plane when the unit is resting on a horizontal surface, together with open grate member which fits into each said slot so as to support a food bearing tray resting on said grate member.

3. The combination recited in claim 2 in which insulated support members are fastened to the external bottom and to the external top surfaces of the unit so that the unit may be operated when resting on a horizontal surface in the inverted mode, said inverted mode being utilized for broiling purposes, with the internal heater element located above the food bearing tray, said unit being also adaptable for operation in the normal mode, when not inverted, as an oven with the internal heater element located below the food bearing tray.

References Cited

UNITED STATES PATENTS

| | | | |
|---|---|---|---|
| 1,506,909 | 9/1924 | Kohlhase | 219—403 X |
| 1,936,215 | 11/1933 | Speaker | 219—454 |
| 2,893,307 | 7/1959 | Rodriguez | 219—404 X |
| 3,159,094 | 12/1964 | Creasce et al. | 99—340 |
| 3,177,342 | 4/1965 | Wickenberg | 219—409 X |
| 3,159,094 | 12/1964 | Crease et al. | 99—340 |
| 3,316,389 | 4/1967 | Markowitz | 219—458 X |
| 3,423,571 | 1/1969 | Trachtenberg et al. | 219—441 |
| 3,454,745 | 7/1969 | Stone | 219—409 X |
| 3,521,030 | 7/1970 | Maahs | 219—386 X |

VOLODYMYR Y. MAYEWSKY, Primary Examiner

U.S. C. X.R.

99—340; 219—403, 404, 409, 414, 454, 458, 475